(12) United States Patent
Erignac et al.

(10) Patent No.: US 8,880,340 B2
(45) Date of Patent: Nov. 4, 2014

(54) AUGMENTED MOBILE PLATFORM LOCALIZATION

(71) Applicant: The Boeing Company, Chicago, IL (US)

(72) Inventors: Charles A Erignac, Kirkland, WA (US); Hui Li, Seattle, WA (US)

(73) Assignee: The Boeing Company, Chicago, IL (US)

( * ) Notice: Subject to any disclaimer, the term of this patent is extended or adjusted under 35 U.S.C. 154(b) by 34 days.

(21) Appl. No.: 13/734,707

(22) Filed: Jan. 4, 2013

(65) Prior Publication Data

US 2014/0195148 A1     Jul. 10, 2014

(51) Int. Cl.
*G01C 21/30*     (2006.01)
*G01C 21/00*     (2006.01)
*G05D 1/02*      (2006.01)

(52) U.S. Cl.
CPC ............ *G01C 21/005* (2013.01); *G05D 1/0282* (2013.01); *G05D 1/024* (2013.01); *G05D 1/027* (2013.01)
USPC ......................................................... 701/445

(58) Field of Classification Search
CPC ................................ G01C 21/30; G01C 21/32
USPC ......................................................... 701/445
See application file for complete search history.

(56) References Cited

U.S. PATENT DOCUMENTS

| | | | |
|---|---|---|---|
| 7,015,831 B2 | 3/2006 | Karlsson et al. | |
| 7,751,651 B2 | 7/2010 | Oldroyd | |
| 2006/0215935 A1 | 9/2006 | Oldroyd | |
| 2009/0185719 A1 | 7/2009 | Erignac | |
| 2009/0222149 A1 | 9/2009 | Murray et al. | |
| 2010/0042382 A1 | 2/2010 | Marsh et al. | |
| 2010/0102980 A1 | 4/2010 | Troy et al. | |
| 2010/0114489 A1 | 5/2010 | Erignac | |
| 2010/0223031 A1* | 9/2010 | Vincent et al. | 703/1 |
| 2010/0319005 A1 | 12/2010 | Erignac | |
| 2011/0007948 A1 | 1/2011 | Oldroyd | |
| 2011/0010007 A1 | 1/2011 | Sarh et al. | |
| 2011/0276172 A1 | 11/2011 | Cobb et al. | |
| 2012/0145823 A1 | 6/2012 | Westerlund | |

OTHER PUBLICATIONS

Dubrofsky, Homography Estimation, The University of British Columbia, Mar. 2009, 30 pgs.
Riisgaard et al, SLAM for Dummies, Massachusetts Institute of Technologies, Dec. 22, 2005, 127 pages.

(Continued)

*Primary Examiner* — James Trammell
*Assistant Examiner* — Michael D Lang
(74) *Attorney, Agent, or Firm* — Smith Moore Leatherwood LLP (57) ABSTRACT

A system includes a transformation module, alignment module and aligned localization module. The transformation module is configured to receive first and second pose estimates of a mobile platform movable within an environment. The first and second pose estimates are relative to different, respective first and second digital maps of the environment in different, respective first and second coordinate systems. The transformation module, then, may be configured to calculate a geometric transform between the first and second digital maps based on the first and second pose estimates. The alignment module may be configured to align the first and second digital maps based on the geometric transform, and thereby generate an aligned digital map. And the aligned localization module may be configured to localize the mobile platform relative to the aligned digital map, and thereby calculate an aligned pose estimate of the mobile platform.

23 Claims, 4 Drawing Sheets

(56) References Cited

OTHER PUBLICATIONS

Mosqueira et al, Analysis of the Indoor GPS system as feedback for the robotic alignment of fuselages using laser radar measurements as comparison, Robotics and Computer-Integrated Manufacturing, vol. 28, 2012, pp. 700-709, Elsevier.

Muelaner et al, Verification of the Indoor GPS System by Comparison With Points Calibrated using a Network of Laser Tracker Measurements, Proceedings of DET2009 6th International Conference on Digital Enterprise Technology Hong Kong, Dec. 14-16, 2009, University of Bath, 9 pgs.

Simultaneous localization and mapping, Wikipedia, http://en.wikipedia.org/w/index.php?title=Simultaneous_location_and_mapping&printable=yes, dated Nov. 21, 2012, 5 pgs.

THRUN, Simultaneous Localization and Mapping, STAR 38, 2008, pp. 13-41, Springer-Verlag Berlin Heidelberg.

Fischler et al, Random Sample Consensus: A Paradigm for Model Fitting with Applications to Image Analysis and Automated Cartography, Communications of the ACM, vol. 24, No. 6, Jun. 1981, pp. 381-395.

Karto Robotics, http://www.kartorobotics.com, dated Dec. 11, 2012, 2 pgs.

\* cited by examiner

AUGMENTED MOBILE PLATFORM LOCALIZATION

TECHNOLOGICAL FIELD

The present disclosure relates generally to mobile platforms and, in particular, to localization of a mobile platform relative to an environment within which the mobile platform is configured to move.

BACKGROUND

Large-scale, structural manufacturing and/or servicing operations in a number of industries often involve a large number of systems. A number of these operations include tasks that are increasingly being performed by machines and robots. And a number of these machines and robots are placed onboard mobile platforms that move within an environment, such as a building or other facility, to enable the machines and robots to perform their tasks.

Effective use of these mobile platforms often depends on their accurate localization within the environment within which they move, which is often an indoor environment. A number of localization solutions have been developed that may be used for this purpose, but each suffers from issues. For example, current solutions developed for automated guided vehicles rely on the presence of surveyed physical landmarks such as paint, tape, magnets or the like on the floor, and laser reflectors on the walls. These landmarks are time consuming and expensive to install. Furthermore, except for laser reflectors, the landmarks constrain the mobile platform to follow pre-defined routes.

Localization solutions based on laser reflectors, sometimes referred to as laser tracking, require installing reflectors at regular intervals on the perimeter of the indoor environment, and making sure that the platform has a line-of-sight to those reflectors. Natural-feature, laser-localization solutions require a static environment, for which a map is created offline and used online to localize the platform by comparing it with laser scans acquired by the platform. These solutions, however, may not be suitable for cluttered, dynamic environments.

Therefore, it may be desirable to have a system and method that takes into account at least some of the issues discussed above, as well as possibly other issues.

BRIEF SUMMARY

Example implementations of the present disclosure are generally directed to a system, apparatus and method for augmented localization of a mobile platform relative to an environment within which the mobile platform is movable. The system may be configured to calculate the mobile platform's position and orientation (sometimes referred to as a pose estimate), in a coordinate system registered to a map of the environment. This pose estimate may be continuously updated and communicated to the mobile platform to support functions such as path planning, path following and collision avoidance. In one example, some of these functions may be further supported by an onboard navigation database that stores the position of one or more destinations, waypoints or the like, and/or data defining one or more navigation lanes, stay-out zones or the like, within the environment. Example implementations of the present disclosure do not rely on static landmarks, and may therefore effectively operate in dynamic and cluttered environments.

According to one aspect of example implementations, the system includes a transformation module, alignment module and aligned localization module. The transformation module is configured to receive first and second pose estimates of a mobile platform movable within an environment. The first and second pose estimates are relative to different, respective first and second digital maps of the environment in different, respective first and second coordinate systems. The transformation module, then, may be configured to calculate a geometric transform (e.g., homographic, affine) between the first and second digital maps based on the first and second pose estimates.

The alignment module may be configured to align the first and second digital maps based on the geometric transform, and thereby generate an aligned digital map. And the aligned localization module may be configured to localize the mobile platform relative to the aligned digital map, and thereby calculate an aligned pose estimate of the mobile platform.

In one example, the transformation module may be configured to receive the first pose estimate from a mapping and localization system onboard the mobile platform, which may be configured to build the first digital map of the environment, and calculate the first pose estimate of the mobile platform relative to the first digital map. In this example, the alignment module may be configured to receive the first digital map from the mapping and localization system. In one example, the mapping and localization system may be configured to build the first digital map and calculate the first pose estimate in accordance with a simultaneous localization and mapping (SLAM) technique.

In one example, the transformation module may be configured to receive the second pose estimate from a wireless locating system configured to calculate the second pose estimate of the mobile platform relative to the second digital map accessible from storage. In this example, the transformation module may be configured to receive the second pose estimate from the wireless locating system comprising an indoor or local positioning system.

In one example, the system may further include a communication interface configured to communicate the aligned pose estimate to the mobile platform to aid navigation of the mobile platform as it moves within the environment.

In other aspects of example implementations, an apparatus and method are provided for augmented localization of a mobile platform. The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Like reference numerals refer to like elements throughout.

Figure 1:
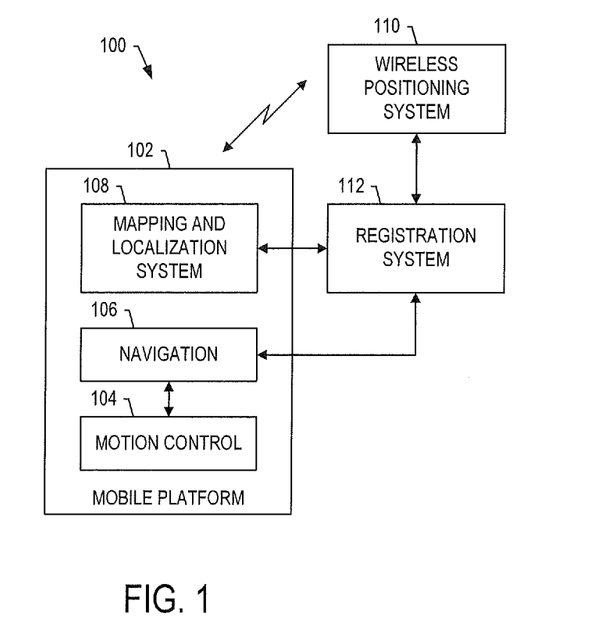
FIG. 1 illustrates an augmented localization system according to one example implementation of the present disclosure.

Referring now to FIG. 1, an augmented localization system 100 is illustrated according to example implementations of the present disclosure. The system may include any of a number of different subsystems (each an individual system) for performing one or more functions or operations with respect to a mobile platform 102. The mobile platform may be movable within an indoor or even an outdoor environment. To support its movement, the mobile platform may include a motion control system 104 configured to control and effect movement of the mobile platform. To support the motion control system, the mobile platform may include a navigation system 106 and perhaps one or more other components such as a collision-avoidance system configured to aid navigation of the mobile platform as it moves within the environment.

In one example, the mobile platform 102 may include an onboard machine or robot, and may be movable within an environment to enable the machine/robot to perform one or more tasks of one or more structural manufacturing and/or servicing operations. In this example, the mobile platform may include one or more components such as a mission-management system configured to support mission-specific tasks of the machine/robot. It should be understood, however, that example implementations may be useful in the context of mobile platforms that do not include an onboard machine or robot, or that include an onboard machine or robot for other types of tasks.

To further support its movement, the mobile platform 102 may require localization within its environment, which may support operation of the navigation system 106. This localization may include acquisition of the mobile platform's position and orientation (sometimes referred to as its pose) on a digital model or map of its environment. The digital map of an environment may be a two-dimensional (2D) or three-dimensional (3D) geometric description of the environment. The digital format of the map may include a description of the environment using coordinates and numerical descriptions of the positions of landmarks within the environment such as objects, surfaces or other distinguishable features. In accordance with example implementations, the landmarks in an environment may differ from environment-to-environment, and may change in an environment over time such as in the case of a dynamic environment. In a 2D digital map, position may be described in terms of orthogonal X, Y coordinates, and in a 3D digital map, position may be described in terms of orthogonal X, Y, Z coordinates.

For a mobile platform 102 capable of three degrees of freedom (3-DOF), its position may be described in terms of X, Y coordinates, and its orientation may be described in terms of yaw. In another example of a mobile platform capable of six degrees of freedom (6-DOF), its position may be described in terms of X, Y, Z coordinates, and its orientation may be described in terms of roll, pitch, yaw. A wheeled platform, for example, may be movable on the ground with 3-DOF, while a handheld platform may be movable with 6-DOF.

An environment and pose of the mobile platform 102 within that environment may be geometrically described from different perspectives or frames of reference (each referring to a respective coordinate system). The same position and orientation of a mobile platform within the environment may therefore be described by different poses relative to different digital maps of the environment in different coordinate systems. As shown in FIG. 1, the augmented localization system 100 may include mapping and localization system 108 configured to build a first digital map of an environment of the mobile platform, and localize the platform relative to the first digital map to calculate a first pose estimate of the mobile platform. The augmented localization system may include a wireless locating system 110 configured to localize the platform relative to a different, second digital map of the environment to calculate a second pose estimate of the mobile platform. The augmented localization system may further include a registration system 112 coupled to the other systems and configured to automatically register or align the first digital map with the second digital map based on the first and second pose estimates. The registration system may thereby generate an aligned digital map to which the mobile platform may be localized. The pose of the mobile platform relative to the aligned digital map, then, may be communicated to the navigation system 106 to aid navigation of the mobile platform as it moves within the environment.

Although being shown as part of the augmented localization system 100, one or more of the mapping and localization system 108, wireless locating system 110 and/or registration system 112 may instead be separate from but in communication with the augmented localization system. Also, although the registration system is shown as being off of the mobile platform 102, in other examples the registration system may be carried onboard the mobile platform similar to the mapping and localization system. It should also be understood that one or more of the subsystems may function or operate as a separate system without regard to others of the subsystems. And further, it should be understood that the augmented localization system may include one or more additional or alternative subsystems than those shown in FIG. 1.

Figure 2:
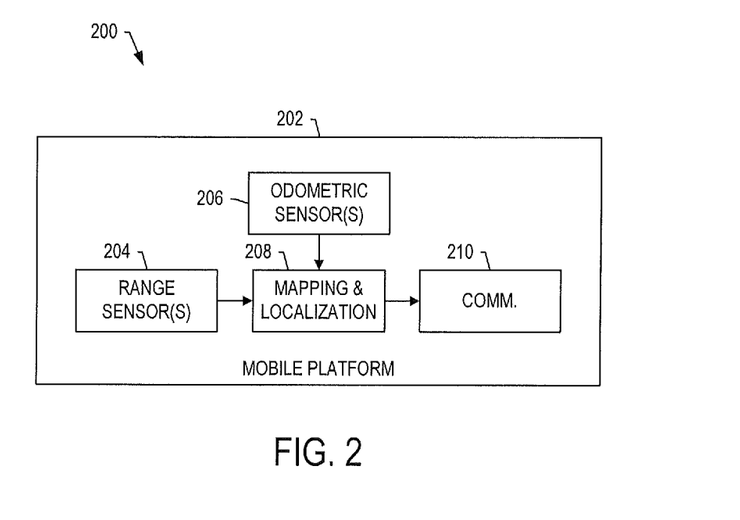
FIG. 2 illustrates an example of a suitable mapping and localization system, according to one example implementation.
Figure 3:
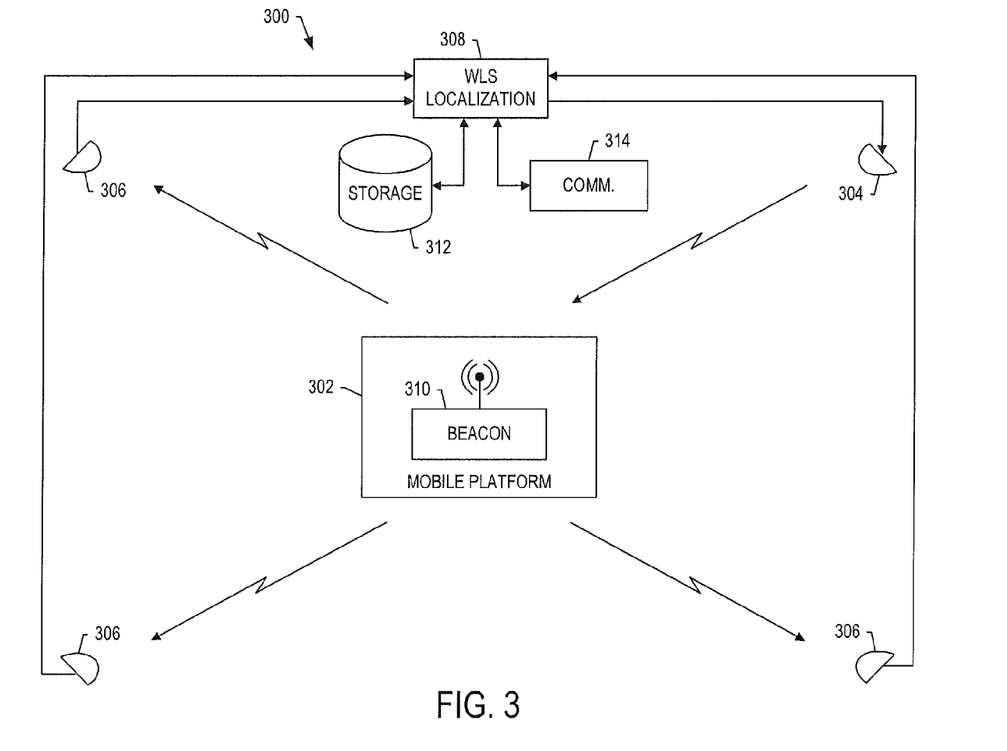
FIG. 3 illustrates an example of a suitable wireless locating system, according to one example implementation.
Figure 4:
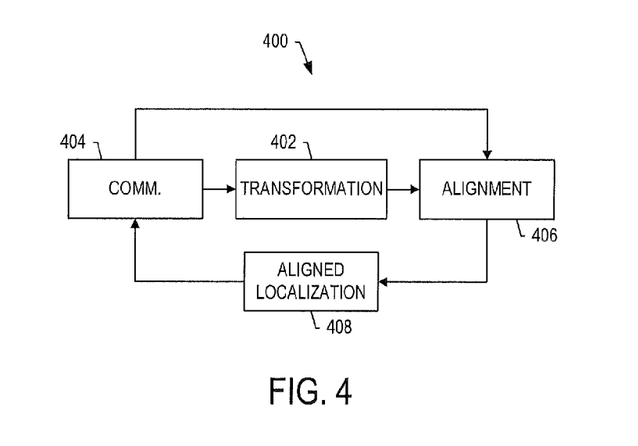
FIG. 4 illustrates an example of a suitable registration system, according to one example implementation.

Reference will now be made to FIGS. 2, 3 and 4, which illustrate more particular examples of a suitable mapping and localization system, wireless locating system and/or registration system, respectively, according to example implementations of the present disclosure.

FIG. 2 illustrates a mapping and localization system 200 according to one example implementation. The mapping and localization system 200 may be one example of the mapping and localization system 108 of the augmented localization system 100 of FIG. 1. In one example, the mapping and localization system may be located onboard a mobile platform 202, which in one example may correspond to the mobile platform 102 of FIG. 1. The mapping and localization system may be generally configured to build a first digital map of the environment of the mobile platform, and localize the mobile platform relative to the first digital map. In one example, the mapping and localization system may be configured to build the first digital map and localize the mobile platform relative to it in accordance with any of a number of different robotic mapping techniques.

The mapping and localization system 200 may include one or more range sensors 204 and/or odometric sensors 206 coupled to a mapping and localization module 208. The range sensor(s) onboard the mobile platform 202 may be configured to scan its environment and provide range measurements between the mobile platform and landmarks around the mobile platform in its environment. The odometric sensor(s) onboard the mobile platform may be configured to provide odometry data as the mobile platform moves within its environment. Examples of suitable range sensors include laser rangefinders, LiDAR (Light Detection and Ranging) sensors, sonar sensors, camera or other visual sensors, or the like. The odometric sensors may be of any of a number of different types of sensors, and may include not only odometric sensors but visual-odometric sensors, inertial measurement units (IMUs) or the like.

Figure 5:
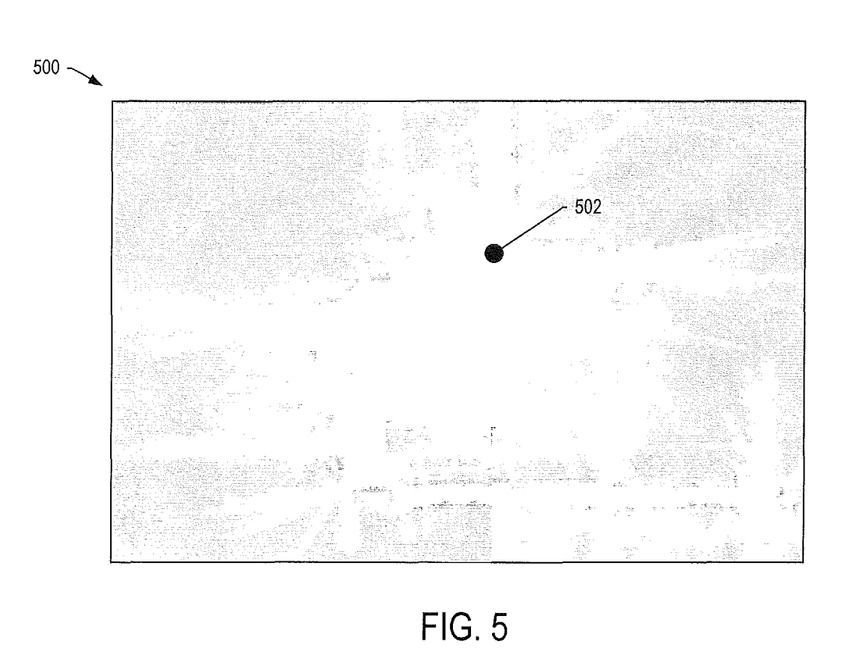
FIG. 5 graphically illustrates one example of a suitable first digital map and first pose estimate, according to one example implementation.

The mapping and localization module 208 may be configured to receive and process the range measurements and odometry data to spatially map the environment relative to the mobile platform 202, and localize the mobile platform relative to that map. The mapping and localization module may spatially map the environment and localize the mobile platform in any of a number of different manners. One example of a suitable manner is the well-known simultaneous localization and mapping (SLAM) technique, although it should be understood that the mapping and localization need not be performed simultaneously. Regardless of the exact manner by which the mapping and localization module spatially maps the environment and localizes the mobile platform, the mapping and localization module may output a spatial map (first digital map) of the environment, and the mobile platform's position and orientation (first pose estimate) relative to the first digital map. FIG. 5 graphically illustrates one example of a suitable first digital map 500 and first pose estimate 502 that may be output by the mapping and localization module according to one example implementation of the present disclosure.

The mapping and localization module 208 may build and continuously update the first digital map, and calculate and continuously update a first pose estimate of the mobile platform 202. The mapping and localization module may handle the first digital map and first pose estimate in any of a number of different manners. In one example, the mapping and localization system 200 may further include a communication interface 210 coupled to the mapping and localization module. In this example, the mapping and localization module may be configured to communicate the first digital map and first pose estimate to the communication interface, which may in turn be configured to communicate the first digital map and first pose estimate to a registration system such as the registration system 112 of FIG. 1.

Briefly returning to FIG. 1, the wireless locating system 110 may be generally configured to localize the mobile platform 102 relative to a second digital map of the environment to calculate a second pose estimate of the mobile platform. The wireless locating system may be any of a number of suitable positioning systems capable of localizing the mobile platform in an indoor environment or outdoor environment, or in an environment that is partially indoor and partially outdoor. In one example, in an outdoor environment, the wireless locating system may include a satellite navigation (e.g., GPS) receiver located onboard the mobile platform and configured to receive signals from a number of satellites. The wireless locating system, then, may include a localization module configured to calculate the second pose estimate of the mobile platform on the second digital map based on the signals. In this example, the second digital map may be accessed from an appropriate storage, such as file storage, database storage, cloud storage or the like.

In one example, the wireless locating system 110 may be additionally or alternatively configured to localize the mobile platform 102 in an indoor environment. In this example, the wireless locating system may include any of a number of different indoor or local positioning systems such as indoor GPS, real-time locating systems (RTLS) or the like.

FIG. 3 illustrates a wireless locating system 300 according to one example implementation. The wireless locating system 300 may be one example of the wireless locating system 110 of the augmented localization system 100 of FIG. 1. In one example, the wireless locating system may be located within the environment of a mobile platform 302, which in one example may correspond to the mobile platform 102 of FIG. 1. As shown, the wireless locating system may include a transmitter 304 and a plurality of receivers 306 coupled to a wireless locating system (WLS) localization module 308 by wire or wirelessly. The processor may be configure to control the transmitter to broadcast a signal that is received by a beacon 310 located onboard the mobile platform. In one example, the beacon may be a radio frequency (RF) transponder or tag, such as an active tag (self powered) or passive tag (which is powered by energy received from the transmitter).

Figure 6:
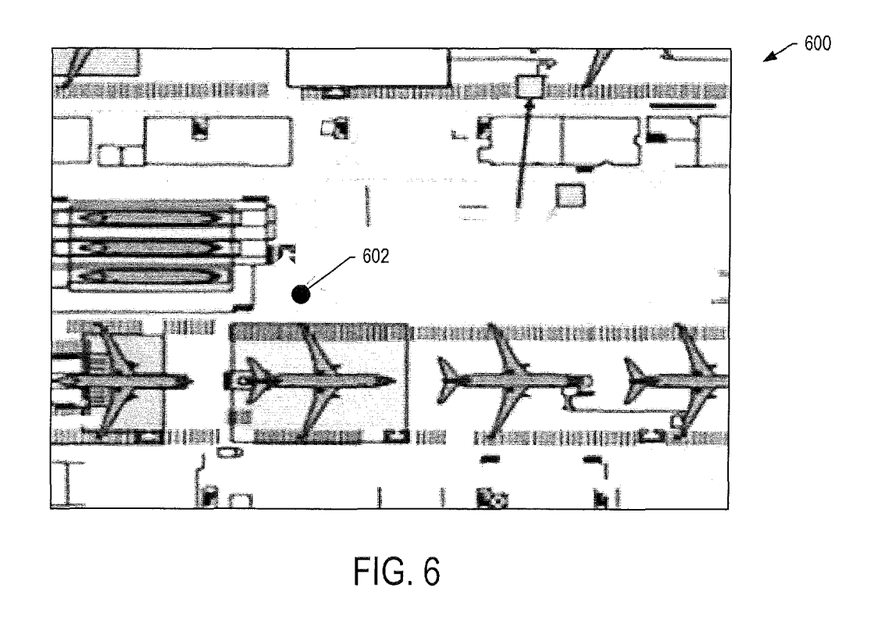
FIG. 6 graphically illustrates one example of a suitable second digital map and second pose estimate, according to one example implementation.

The beacon 310 may be configured to receive the signal from the transmitter 304, and respond to the signal by transmitting a transponding signal that includes information identifying the beacon, and thus the mobile platform 302. The receivers 306 located throughout the environment may receive the transponding signal, and provide respective versions of the transponding signal to the WLS localization module 308. The WLS localization module may process information in the versions of the received transponding signal to identify the beacon and localize the mobile platform relative to a second digital map of the environment. This may be accomplished in any of a number of different manners, such as by triangulation using the time-of-arrival of the version of the transponded signal received by each of the receivers. In one example, the second digital map may be stored in an appropriate storage 312, such as file storage, database storage, cloud storage or the like. The WLS localization module may thereby calculate a second pose estimate of the mobile platform relative to the second digital map. FIG. 6 graphically illustrates one example of a suitable second digital map 600 and second pose estimate 602 that may be output by the WLS localization module according to one example implementation of the present disclosure.

The WLS localization module 308 may calculate and continuously update a second pose estimate of the mobile platform 302 relative to the second digital map. The WLS localization module may handle the second digital map and second pose estimate in any of a number of different manners. In one example, the wireless locating system 300 may further include a communication interface 314 coupled to the WLS localization module. In this example, the WLS localization module may be configured to communicate the second digital map and second pose estimate to the communication interface, which may in turn be configured to communicate the second digital map and second pose estimate to a registration system such as the registration system 112 of FIG. 1. In another example, the storage 312 including the second digital map may be accessible by the registration system. In this example, the WLS localization module may be configured to communicate the second pose estimate to the registration system via the communication interface, and the registration system may access the second digital map from its storage.

FIG. 4 illustrates a registration system 400 according to one example implementation. The registration system 400 may be one example of the registration system 112 of the augmented localization system 100 of FIG. 1. The registration system may be configured to register or align first and second digital maps of an environment of a mobile platform such as the mobile platform 102 of FIG. 1, and localizing the mobile platform relative to the resulting aligned digital map. As shown, the registration system may include a transformation module 402 configured to receive first pose estimates of the mobile platform relative to a first digital map, and second pose estimates of the mobile platform relative to a second digital map. In one example, the transformation module may be coupled to a communication interface 404 configured to receive the first pose estimates from a mapping and localization system (e.g., mapping and localization system 108), as or after the mapping and localization system calculates the first pose estimates. Similarly, the communication interface may be configured to receive the second pose estimates from a wireless locating system (e.g., wireless locating system 110), as or after the wireless locating system calculates the second pose estimates.

The transformation module 402 may be configured to calculate a geometric transform between the first and second digital maps based on the first and second pose estimates. Examples of suitable geometric transforms include a homographic transform, affine transform or the like. The transformation module may calculate the geometric transform in any of a number of different manners. In one example, the transformation module may calculate the geometric transform in accordance with an iterative method such as the random sample consensus (RANSAC) method. In this regard, the transformation module may calculate and continuously update the geometric transform as it receives first pose estimates and second pose estimates, such as those estimates may be continuously calculated by respective systems.

The registration system 400 may include an alignment module 406 configured to receive the geometric transform, and first and second digital maps of the environment of the mobile platform. The alignment module may be coupled to and receive the geometric transform from the transformation module 402. In one example, the alignment module may also be coupled to the communication interface 404 configured to receive the first digital map from a mapping and localization system (e.g., mapping and localization system 108), as or after the mapping and localization system builds or updates the first digital map. Similarly, for example, the communication interface may be configured to receive the second digital map from a wireless locating system (e.g., wireless locating system 110). In another example, storage 312 including the second digital map may be accessible by the alignment module.

Regardless of the exact manner by which the alignment module 406 receives the geometric transform, and first and second digital maps, the alignment module may be configured to register or align the first digital map with the second digital map based on the geometric transform, such as in any of a number of known manners. The alignment module may thereby generate an aligned digital map. The alignment module may communicate the aligned digital map to an aligned localization module 408 to which the alignment module may be coupled. The aligned localization module may then be configured to localize the mobile platform relative to the aligned digital map, and may thereby calculate an aligned pose estimate of the mobile platform. This may be accomplished in any of a number of different manners.

As explained above, the first digital map and first pose estimate may be built or calculated and continuously updated. Similarly, the second pose estimate and geometric transform may be calculated and continuously updated. In one example, then, the alignment module 406 may continuously update the aligned digital map, and the aligned localization module 408 may continuously update the aligned pose estimate. As or after calculating or updating the aligned pose estimate, the aligned localization module may communicate the aligned pose estimate, such as back to the mobile platform (e.g., navigation system 106 of mobile platform 102) to aid navigation of the mobile platform as it moves within the environment. In one example, this may be accomplished via the communication interface 404 to which the aligned localization module may be coupled.

Returning to FIG. 1, in one more particular example, the mobile platform 102 may perform navigation tasks in the first coordinate system of the first digital map. In this example, the aligned digital map may be in the same first coordinate system as the first digital map. This may be because the first digital map contains a dynamic depiction of the environment as built by the mapping and localization system 108. The second digital map utilized by the wireless locating system 110 may be expressed in a different, second coordinate system. This second digital map may depict, for example, destinations, travel lanes, stay-out zones and the like. The registration system 112 (e.g., transformation module 402) may calculate a geometric transform (e.g., homographic, affine) between the first and second digital maps.

The registration system 112 (e.g., the alignment module 406) may use the geometric transform to generate an aligned digital map that fuses the contents of the first and second digital maps. In one example, real obstacles in the built first digital map may be combined in the aligned digital map with elements from the second digital map, such as virtual obstacles (e.g., stay out zones), destinations, travel lanes and the like. The navigation system 106 or another system (e.g., path planner) in communication with the navigation system may then produce a path for movement of the mobile platform. This path may be sent to the motion control system 104 expressed in the first coordinate system. In one example, the path may also be sent to another system such as a control station to be overlaid over the second digital map in the second coordinate system, such as for display purposes.

Figure 7:
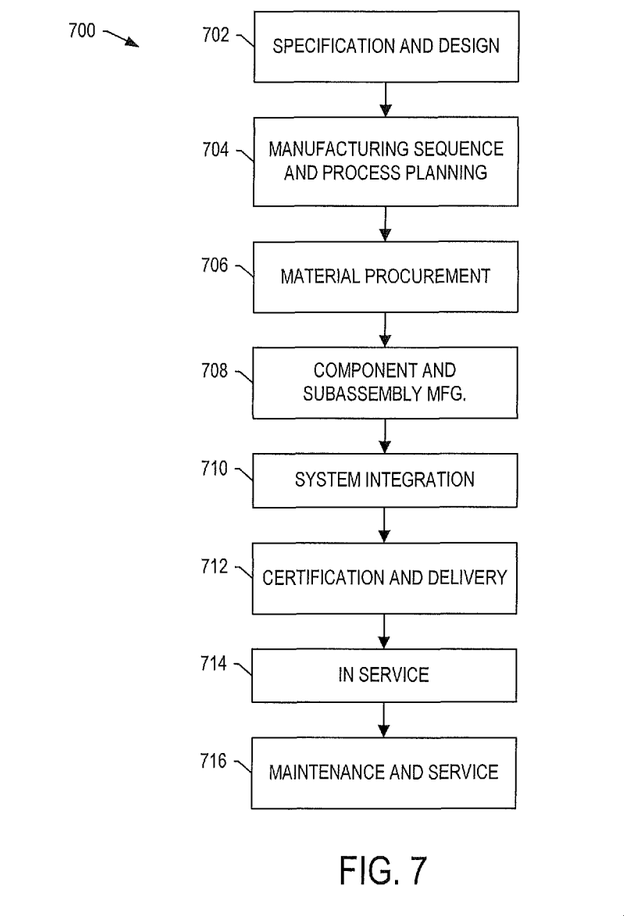
FIG. 7 is flowchart illustrating various operations in an aircraft production and service methodology according to one example implementation.
Figure 8:
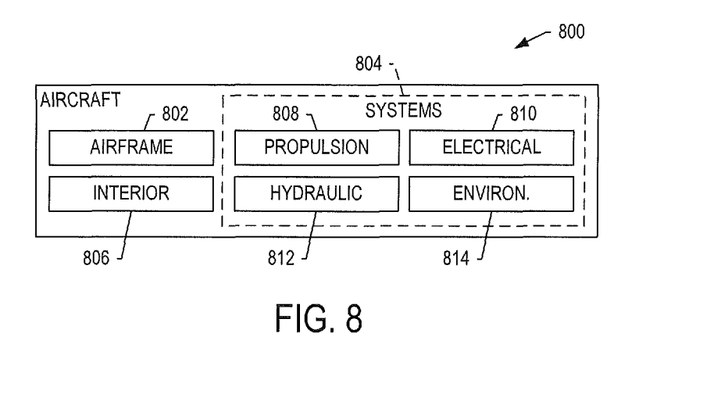
FIG. 8 is a block diagram of an aircraft according to one example implementation.

Example implementations of the disclosure may find use in a variety of potential applications, particularly in the transportation industry, including for example, aerospace, marine and automotive applications. Thus, referring now to FIGS. 7 and 8, example implementations may be used in the context of an aircraft manufacturing and service method 700 as shown in FIG. 7, and an aircraft 800 as shown in FIG. 8. During pre-production, the example method may include specification and design 702 of the aircraft, manufacturing sequence and processing planning 704 and material procurement 706. During production, component and subassembly manufacturing 708 and system integration 710 of the aircraft takes place. The disclosed system and method may be specified for use, for example, during component and subassembly manufacturing, and/or system integration.

In various examples, the disclosed system and method may be used during any one or more of the material procurement process 706, component and subassembly manufacturing process 708 or system integration 710. Thereafter, the aircraft 800 may go through certification and delivery 712 in order to be placed in service 714. While in service by a customer, the aircraft may be scheduled for routine maintenance and service 716 (which may also include modification, reconfiguration, refurbishment or the like). The system and method of example implementations may be used while the aircraft is in service, and in one example, during maintenance and service of the aircraft.

Each of the processes of the example method 700 may be performed or carried out by a system integrator, third party and/or operator (e.g., customer). For the purposes of this description, a system integrator may include for example any number of aircraft manufacturers and major-system subcontractors; a third party may include for example any number of vendors, subcontractors and suppliers; and an operator may include for example an airline, leasing company, military entity, service organization or the like.

As shown in FIG. 8, an example aircraft 800 produced by the example method 700 may include an airframe 802 with a plurality of systems 804 and an interior 806. Examples of high-level systems 804 include one or more of a propulsion system 808, electrical system 810, hydraulic system 812, environmental system 814 or the like. Any number of other systems 804 may be included. Although an aerospace example is shown, the principles of the disclosure may be applied to other industries, such as the marine and automotive industries.

Systems and methods embodied herein may be employed during any one or more of the stages of the example production and service method 700. For example, system implementations, method implementations or a combination thereof may be utilized during the production stages 708 and 710, which may in one example enable effective use of machines and robots to perform various production tasks. Similarly, for example, system implementations, method implementations or a combination thereof may be utilized while the aircraft 800 is in service 714 and/or during maintenance and service 716, such as to enable effective use of machines or robots to perform respective, appropriate tasks. This may in turn substantially expedite assembly of or reduce the cost of an aircraft 800 and/or its maintenance and service.

According to example implementations of the present disclosure, the augmented localization system 100 and its subsystems including mapping and localization system 108, wireless locating system 110 and registration system 112 may be implemented by various means. Similarly, the examples of a mapping and localization system 200, wireless locating system 300 and registration system 400, including each of their respective elements, may be implemented by various means according to example implementations. Means for implementing the systems, subsystems and their respective elements may include hardware, alone or under direction of one or more computer program code instructions, program instructions or executable computer-readable program code instructions from a computer-readable storage medium.

In one example, one or more apparatuses may be provided that are configured to function as or otherwise implement the systems, subsystems and respective elements shown and described herein. In examples involving more than one apparatus, the respective apparatuses may be connected to or otherwise in communication with one another in a number of different manners, such as directly or indirectly via a wireline or wireless network or the like.

Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor connected to a memory.

The processor is generally any piece of hardware that is capable of processing information such as, for example, data, computer-readable program code, instructions or the like (generally "computer programs," e.g., software, firmware, etc.), and/or other suitable electronic information. More particularly, for example, the processor may be configured to execute computer programs, which may be stored onboard the processor or otherwise stored in the memory (of the same or another apparatus). The processor may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory is generally any piece of hardware that is capable of storing information such as, for example, data, computer programs and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communications interface and/or one or more user interfaces. The communications interface may be configured to transmit and/or receive information, such as to and/or from other apparatus(es), network(s) or the like. The communications interface may be configured to transmit and/or receive information by physical (wireline) and/or wireless communications links. Examples of suitable communication interfaces include a network interface controller (NIC), wireless NIC (WNIC) or the like.

The user interfaces may include a display and/or one or more user input interfaces. The display may be configured to present or otherwise display information to a user, suitable examples of which include a liquid crystal display (LCD), light-emitting diode display (LED), plasma display panel (PDP) or the like. The user input interfaces may be wireline or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which these disclosure pertain having the benefit of the teachings presented in the foregoing descriptions and the associated drawings. Therefore, it is to be understood that the disclosure are not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system comprising:
   a transformation module configured to receive first and second pose estimates of a mobile platform movable within an environment, the first and second pose estimates being relative to different, respective first and second digital maps of the environment in different, respective first and second coordinate systems, the transformation module being configured to calculate a geometric transform between the first and second digital maps based on the first and second pose estimates;
   an alignment module configured to align the first and second digital maps based on the geometric transform, and thereby generate an aligned digital map;
   an aligned localization module configured to localize the mobile platform relative to the aligned digital map, and thereby calculate an aligned pose estimate of the mobile platform; and
   a communication interface configured to communicate the aligned pose estimate to the mobile platform to aid navigation of the mobile platform as it moves within the environment.

2. The system of claim 1, wherein the transformation module is configured to receive the first pose estimate from a mapping and localization system onboard the mobile platform, the mapping and localization system being configured to build the first digital map of the environment, and calculate the first pose estimate of the mobile platform relative to the first digital map.

3. The system of claim 2, wherein the alignment module is configured to receive the first digital map from the mapping and localization system.

4. The system of claim 2, wherein the transformation module is configured to receive the first pose estimate from the mapping and localization system configured to build the first digital map and calculate the first pose estimate in accordance with a simultaneous localization and mapping technique.

5. The system of claim 1, wherein the transformation module is configured to receive the second pose estimate from a wireless locating system configured to calculate the second pose estimate of the mobile platform relative to the second digital map accessible from storage.

6. The system of claim 5, wherein the transformation module is configured to receive the second pose estimate from the wireless locating system comprising an indoor or local positioning system.

7. The system of claim 1, wherein the first and second digital maps cover the same space of the environment, and the first and second pose estimates are different descriptions of the same position and orientation of the mobile platform in the same space of the environment.

8. The system of claim 1 further comprising:
   a mapping and localization system being configured to build the first digital map of the environment, and calculate the first pose estimate of the mobile platform relative to the first digital map, the first digital map depicting real obstacles in the environment;
   a wireless locating system (WLS) localization module configured to control a transmitter to broadcast a signal received by the mobile platform, receive a responsive transponding signal from the mobile platform to calculate the second pose estimate of the mobile platform relative to the second digital map, the second digital map depicting one or more of a destination, travel lane or stay-out zone; and a communication interface configured to communicate the aligned pose estimate to the mobile platform to aid navigation of the mobile platform as it moves within the environment.

9. An apparatus comprising a processor and a memory storing computer-readable program code portions that, in response to execution by the processor, cause the apparatus to at least:

receive first and second pose estimates of a mobile platform movable within an environment, the first and second pose estimates being relative to different, respective first and second digital maps of the environment in different, respective first and second coordinate systems;

calculate a geometric transform between the first and second digital maps based on the first and second pose estimates;

align the first and second digital maps based on the geometric transform, and thereby generate an aligned digital map; and localize the mobile platform relative to the aligned digital map, and thereby calculate an aligned pose estimate of the mobile platform, wherein the apparatus further comprises a communication interface configured to communicate the aligned pose estimate to the mobile platform to aid navigation of the mobile platform as it moves within the environment.

10. The apparatus of claim 9, wherein the apparatus is caused to receive the first pose estimate from a mapping and localization system onboard the mobile platform, the mapping and localization system being configured to build the first digital map of the environment, and calculate the first pose estimate of the mobile platform relative to the first digital map.

11. The apparatus of claim 10, wherein the apparatus is caused to receive the first digital map from the mapping and localization system.

12. The apparatus of claim 10, wherein the apparatus is caused to receive the first pose estimate from the mapping and localization system configured to build the first digital map and calculate the first pose estimate in accordance with a simultaneous localization and mapping technique.

13. The apparatus of claim 9, wherein the apparatus is caused to receive the second pose estimate from a wireless locating system configured to calculate the second pose estimate of the mobile platform relative to the second digital map accessible from storage.

14. The apparatus of claim 13, wherein the apparatus is caused to receive the second pose estimate from the wireless locating system comprising an indoor or local positioning system.

15. The apparatus of claim 9, wherein the first and second digital maps cover the same space of the environment, and the first and second pose estimates are different descriptions of the same position and orientation of the mobile platform in the same space of the environment.

16. A method comprising:

receiving first and second pose estimates of a mobile platform movable within an environment, the first and second pose estimates being relative to different, respective first and second digital maps of the environment in different, respective first and second coordinate systems;

calculating a geometric transform between the first and second digital maps based on the first and second pose estimates;

aligning the first and second digital maps based on the geometric transform, and thereby generating an aligned digital map;

localizing the mobile platform relative to the aligned digital map, and thereby calculating an aligned pose estimate of the mobile platform; and communicating the aligned pose estimate to the mobile platform to aid navigation of the mobile platform as it moves within the environment.

17. The method of claim 16, wherein the first pose estimate is received from a mapping and localization system onboard the mobile platform, the mapping and localization system being configured to build the first digital map of the environment, and calculate the first pose estimate of the mobile platform relative to the first digital map.

18. The method of claim 17, wherein the aligning the first and second digital maps includes receiving the first digital map from the mapping and localization system.

19. The method of claim 17, wherein the first pose estimate is received from the mapping and localization system configured to build the first digital map and calculate the first pose estimate in accordance with a simultaneous localization and mapping technique.

20. The method of claim 16, wherein the second pose estimate is received from a wireless locating system configured to calculate the second pose estimate of the mobile platform relative to the second digital map accessible from storage.

21. The method of claim 20, wherein the second pose estimate is received from the wireless locating system comprising an indoor or local positioning system.

22. The method of claim 16, wherein the first and second digital maps cover the same space of the environment, and the first and second pose estimates are different descriptions of the same position and orientation of the mobile platform in the same space of the environment.

23. The method of claim 16 further comprising:

building the first digital map of the environment using a mapping and localization system, and calculating the first pose estimate of the mobile platform relative to the first digital map, the first digital map depicting real obstacles in the environment; and broadcasting, via a wireless locating system, a signal received by the mobile platform, and receiving a responsive transponding signal from the mobile platform to calculate the second pose estimate of the mobile platform relative to the second digital map, the second digital map depicting one or more of a destination, travel lane or stay-out zone.

* * * * *